United States Patent [19]

Land

[11] 3,777,647

[45] Dec. 11, 1973

[54] PHOTOGRAPHIC APPARATUS AND METHOD FOR TREATING PHOTOGRAPHIC MATERIALS WITH A LIQUID

[75] Inventor: Edwin H. Land, Cambridge, Mass.

[73] Assignee: Polaroid Corporation, Cambridge, Mass.

[22] Filed: May 23, 1972

[21] Appl. No.: 255,976

[52] U.S. Cl. .................................... 95/89 L, 95/13

[51] Int. Cl. ............................................ G03d 5/02

[58] Field of Search ...................... 95/13, 89 R, 89 L

[56] References Cited

UNITED STATES PATENTS

| | | | |
|---|---|---|---|
| 2,991,703 | 7/1961 | Eloranta | 95/13 |
| 3,588,030 | 6/1971 | Hile et al. | 95/89 L X |
| 3,472,138 | 10/1969 | Robin et al. | 95/13 |
| 3,590,708 | 7/1971 | Finelli | 95/13 |

*Primary Examiner*—Fred L. Braun

*Attorney*—Stanley H. Mervis

[57] ABSTRACT

Photographic apparatus for and method of processing an exposed area of a layer of photosensitive image-recording material by confining the layer between a pair of superposed sheets and distributing a processing liquid, e.g., having a viscosity approximating that of water, between the sheets in contact with the exposed area. The liquid is introduced into a region between the sheets defined by two parallel, spaced linear regions at least equal in length to the width of the exposed area at which compressive pressure is applied to the sheets by two pairs of pressure-applying members. The sheets are held together at the lateral edges of the exposed area to prevent escape of the processing liquid from between the sheets and the two pairs of pressure-applying members are moved relative to the sheets from one end of the exposed area to the other end to permit the liquid to be absorbed into the exposed area of the photosensitive material. During relative motion of the pressure-applying members and sheets, at least one pressure-applying member of each pair is biased toward the other pair to reduce the spacing between the linear regions and maintain the liquid under pressure as it is absorbed by the photosensitive material. The processing liquid is supplied from a rupturable container attached to the sheets at one end of the exposed area and excess processing liquid overrun is collected in an absorbant trap at the opposite end of the exposed area by relieving the pressure exerted on the sheets.

42 Claims, 15 Drawing Figures

PHOTOGRAPHIC APPARATUS AND METHOD FOR TREATING PHOTOGRAPHIC MATERIALS WITH A LIQUID

This invention relates to photographic process and processing apparatus useful in the formation of photographic transfer images, and particularly to processes and apparatus in which a processing liquid is distributed within a film assemblage within the camera in which the film assemblage is exposed.

Processing apparatus, particularly cameras, for exposing and immediately treating a photosensitive element to produce a visible transfer image are well-known in the art and have been commercially available for a number of years. The desirability and advantages of performing image-forming processing within the camera have been made attainable by virtue of photographic products, process and apparatus that enable the exposed photosensitive image-recording material to be treated with a liquid in such a way that the liquid is confined to the exposed product and prevented from contacting components of the camera. In most instances, particularly in commercially available in-camera processing systems of the personal hand-carried type, the liquid processing composition employed to produce a visible transfer image is highly viscous and is distributed for permeation into the exposed photosensitive material by spreading the viscous liquid in a thin layer between a pair of superposed, liquid-confining layers comprising portions of a film assemblage. A viscous liquid is employed primarily to facilitate uniform distribution of the liquid throughout the extent of an exposed area, usually rectangular, of a layer of a photosensitive material. The use of a viscous liquid also aids in confining the liquid to the film assembly and preventing it from escaping and contaminating the interior of the camera or coming into contact with the person, clothing, etc., of the user.

For a number of years applicant and others skilled in the art have recognized that a number of advantages could be realized if it were possible to employ a low-viscosity processing liquid, that is, a liquid having a viscosity about the same as water, to treat an exposed, photosensitive layer in conjunction with an image-receptive layer to produce a diffusion transfer image. Applicant's interest and that of his assignee, in achieving a supply and distribution method for a non-viscous or low-viscosity, processing liquid adapted to use in a manually portable camera are evidenced by a number of patents including U.S. Pat. Nos. 3,194,183, 3,405,617, 3,405,618, 3,485,628 and Re26,324. These patents note a number of advantages for such a process particularly when used in the formation of dye transfer images such as by a dye developer diffusion transfer process. These advantages include improvement in the efficiency of the diffusion transfer process and higher quality color transfer images resulting from the use of less liquid and closer contact between the photosensitive layer and an image-receiving layer than is possible with a viscous liquid. Multicolor transfer images formed by absorbing a processing liquid into an exposed photosensitive layer and then pressing the photosensitive layer into face-to-face contact with an image-receiving layer, exhibit improved density and color quality as well as higher resolution. Additionally such transfer images are formed in a shorter time, less liquid is employed and the liquid contains fewer agents including film forming materials. Thus, not only is the image forming process more rapid and produces an improved image, but there is less waste liquid, requirements for collecting excess liquid are minimized and an improved product is obtained at substantially less cost.

Because of its free flowing character, a low-viscosity liquid such as a water solution, presents a number of storage, handling, distribution and confinement problems when in-camera processing is attempted. Chief among these problems are confining the liquid to a film assemblage out of contact with the camera in which the film assemblage is exposed and processed while at the same time, distributing the liquid in such a way that all portions of the exposed area of a photosensitive layer are uniformly impregnated with the liquid. Another problem is to perform these basic functions with a minimum of equipment and in apparatus that is small, compact, inexpensive, reliable and simple and easy to operate.

Objects of the invention are: to provide a novel and improved method of distributing a free-flowing, processing liquid within a photographic film assemblage so as to uniformly and completely impregnate an exposed area of a photosensitive layer; and to provide a method as described which is rapid, reliable, insures confinement of the liquid within the film unit and can be performed simply and easily in a manually, hand-operated and portable camera.

Other objects of the invention are: to provide novel and improved photographic processing apparatus suitable for incorporation in a manually portable camera for effecting in-camera processing of exposed photosensitive materials by a process such as described; and to provide apparatus of the type described which is small and compact, reliable in its operation and is relatively inexpensive to construct and assemble and is simple and easy to use.

These and other objects of the invention are achieved by providing a method and apparatus in which compressive pressure is applied to two spaced linear regions of a pair of superposed sheets and a non-viscous, processing liquid is introduced between the portions of the sheets intermediate the spaced linear regions. These linear regions extend at least from side to side of the exposed area to be processed and the two sheets are retained together adjacent the sides of the exposed area so as to prevent escape of the processing liquid from between the portions of the sheets defined on two sides by the linear regions at which compressive pressure is applied. The pressure means employed to compress the sheets in the spaced linear regions and the sheets are moved relative to one another from one end of the exposed area to the other to distribute the liquid in contact with the entire exposed area and provide an opportunity for the liquid to be absorbed therein. In order to insure complete contact between the liquid and the photosensitive layer in the region in which the liquid is confined between the two sheets, the pressure means are biased toward one another so as to reduce the spacing between the linear regions and maintain the liquid under hydraulic pressure sufficient to hold the sheets apart as the liquid is advanced relative to and absorbed by the photosensitive material. The method and apparatus of the invention find utility with a variety of different forms and types of film assemblages and are useful in producing transfer images by a number of different image-forming processes.

Other objects of the invention will in part be obvious and will in part appear hereinafter.

The invention accordingly comprises the apparatus possessing the construction, combination of elements and arrangement of parts and the process involving the several steps and the relation and order of one or more of such steps with respect to each of the others, which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figures 1, 2:
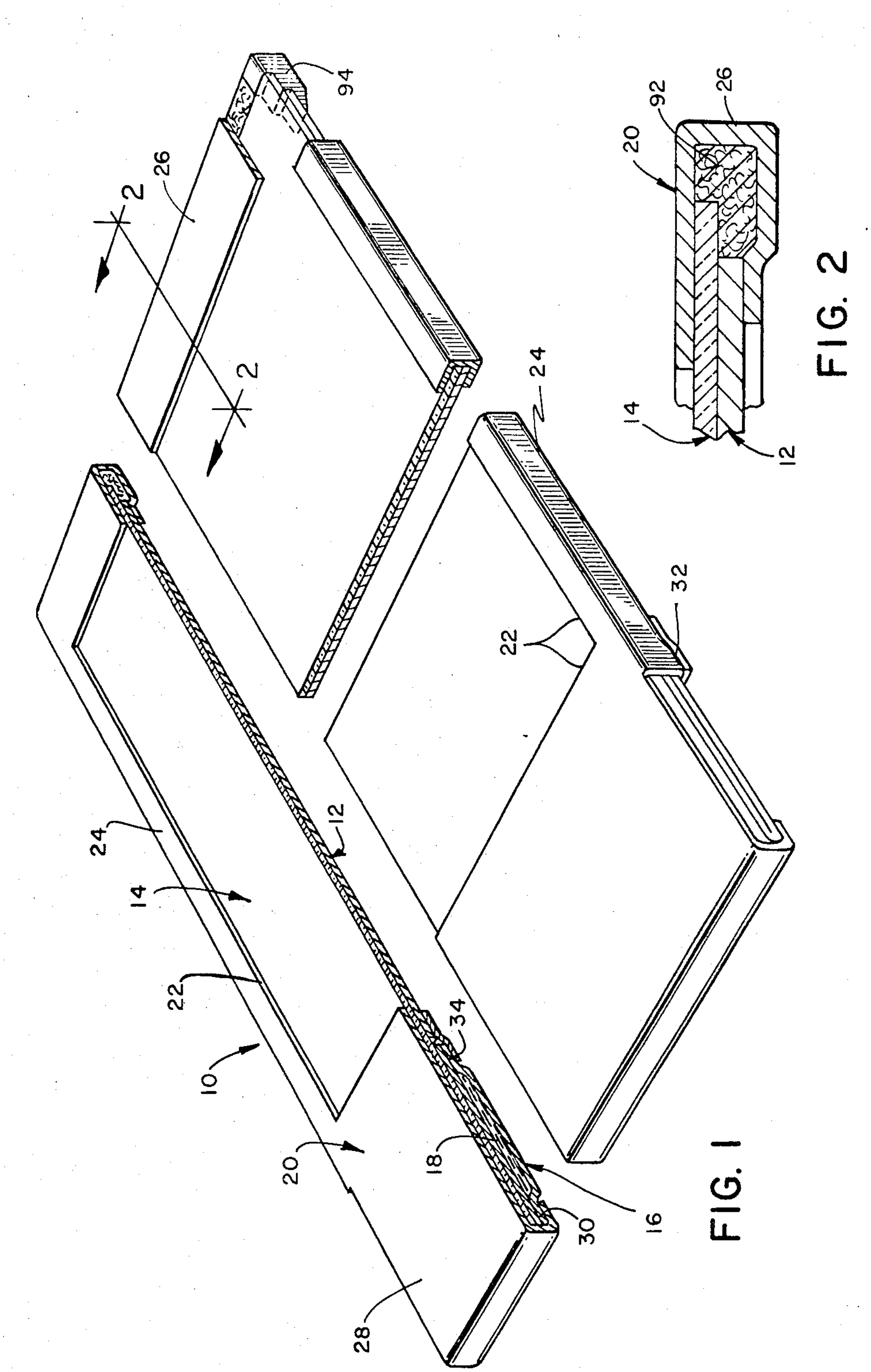
FIG. 1 is a perspective view, partially in section, showing a film unit of the type useful in the method and apparatus of the invention.
FIG. 2 is a fragmentary sectional view of a portion of the film unit of FIG. 1.
Figure 3:
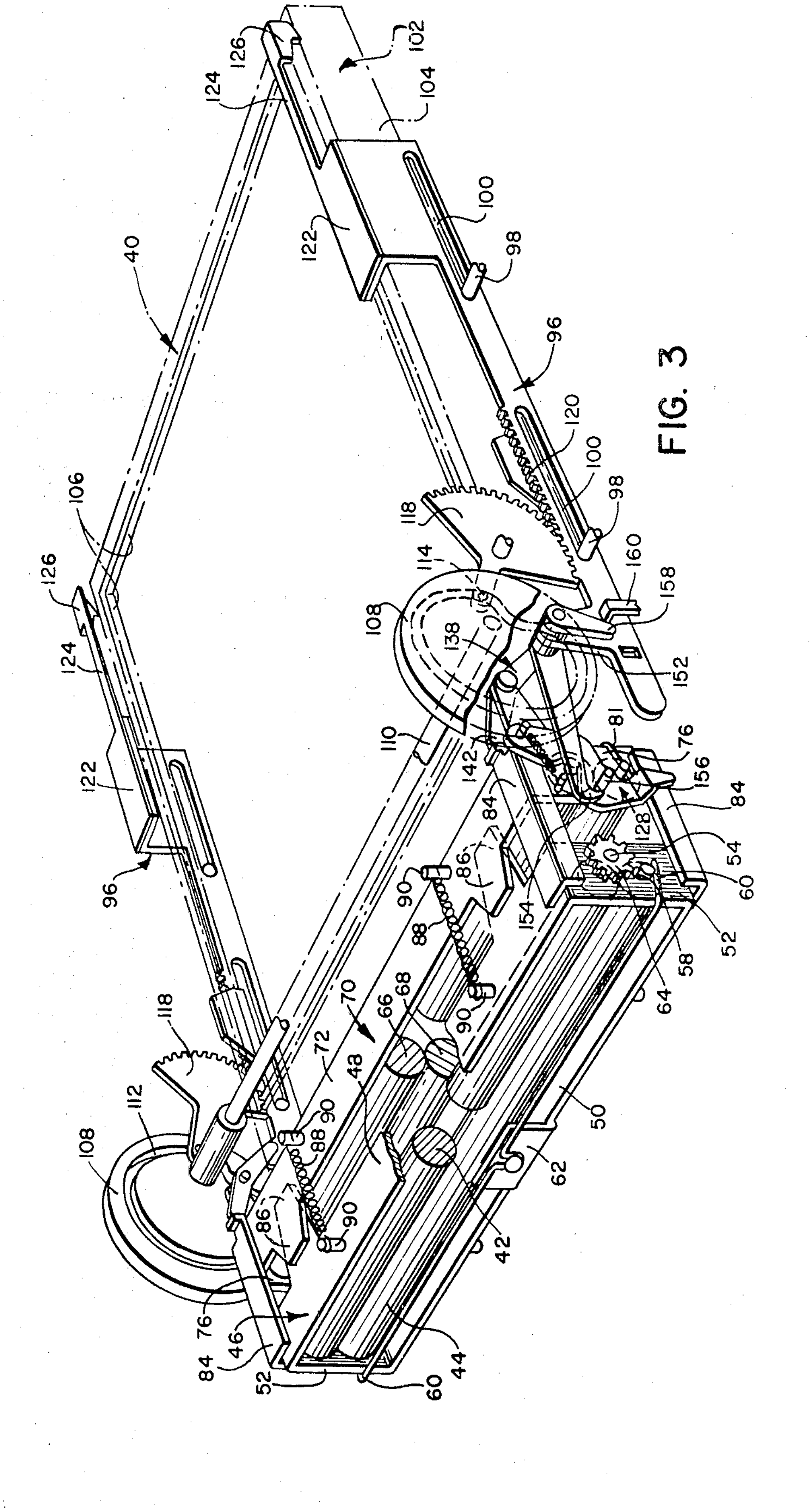
FIG. 3 is a perspective view, partially broken away, of photographic processing apparatus constructed according to the invention and especially designed to practice the method thereof.

Among their numerous advantages, the method and apparatus of the invention, as previously noted, are readily adapted to and function equally well with a number of different film assemblage constructions to produce transfer images by a variety of image-forming processes. The film assemblage may comprise a single photosensitive area adapted to be exposed and processed or a multiplicity of such areas. While it is a requirement that the film assemblage include at least two elements, one of which is a flexible sheet, adapted to be superposed for confining the liquid, the elements or sheets may be either separate or superposed prior to exposure; they may be permanently or temporarily secured in face-to-face relation; and they may act as supports for various layers of photographic materials involved in image formation; or one of the elements may merely function as an aid in confining the processing liquid. Generally, in transfer image-forming processes adapted to be performed by the method and apparatus of the invention, an area of a layer containing a photosensitive image-recording material is exposed and is impregnated with the processing liquid which initiates formation of an image-wise distribution of transferable image-forming substances which are transferred by diffusion to an image-receptive layer closely associated with the photosensitive layer to form a visible image in the image-receptive layer. The image-receptive layer may be carried on a support separate from the support for the photosensitive layer, or it may be on the same support; and may be designed to remain associated with the photosensitive layer or to be separated therefrom following completion of transfer image formation. Although the photosensitive, image-recording material itself usually includes silver halide, the diffusible image-forming substances which make up the transfer image may comprise a number of different compounds including for example, soluble silver complexes, dyes, dye developers, dye formers and the like, adapted to form monotone or full color transfer images. The image-forming substance may be initially diffusible or rendered diffusible imagewise during processing. Diffusion transfer image-forming processes of the foregoing type are so well known in the art as to be considered to require no further description here.

The method and apparatus of the present invention find what is perhaps their greatest utility in photographic process utilizing dye developers to produce full color trasnfer images in a very short time. They find particular utility in process of this type in which the liquid is distributed between a layer of photosensitive image-recording material carried on one sheet and an image-receptive layer carried on another sheet because they interpose no viscous film-forming layer between the sheets to influence or interfere with the diffusion transfer process. A typical process of this type and the materials useful therein are disclosed, for example, in the aforementioned U.S. Pat. No. 3,485,628.

The present invention is basically concerned with a method of and apparatus for advancing a mass or quantity of a non-viscous processing liquid between a pair of sheets in contact with an exposed area of a photosensitive layer to absorb the liquid into the layer while simultaneously pressing the sheets into face-to-face contact behind the advancing mass of processing liquid. A major problem in spreading or advancing a mass of free-flowing liquid between the facing surfaces of superposed sheets, and particularly sheets which may be prelaminated to one another, is insuring that the liquid will contact all portions of the facing surfaces throughout the desired area. The difficulty arises due to the natural tendency of the liquid to flow along the path of least resistance between the sheets rather than as a mass extending transverse to the direction of spreading and from side to side of the area to be treated.

In accordance with the invention, the desired spreading of an elongated mass of free-flowing liquid is accomplished with the aid of two pairs of pressure-applying members adapted to apply compressive pressure to spaced linear, and preferably parallel, regions of the sheets extending at least from side to side of the area to be processed and means for effecting relative motion between the pairs of pressure-applying members and the sheets. The mass of liquid is contained between the portions of the sheets bounded by the linear regions and regions of the sheets held together at the sides of the area to be treated. At least one pressure-applying member of each pair is biased toward a pressure-applying member of the other pair so as to reduce the spacing between the linear regions and maintain the processing liquid under hydraulic pressure sufficient to hold the facing surfaces of the sheets apart from one another and insure contact between the liquid and sheets throughout the area intermediate the linear regions. As the pressure-applying members and sheets are moved relative to one another and liquid is absorbed from the advancing mass thereof, at least the pressure-applying members of each pair that are biased toward one another move closer together reducing the spacing between the linear regions and maintaining the hydraulic pressure on the liquid confined between the sheets intermediate the linear regions.

A typical single exposure photographic film assemblage including all the materials required to produce a full color photographic image and adapted for use in the method and apparatus of the invention is illustrated in FIGS. 1 and 2 of the drawings. The structure and composition of the various components of the film assemblage are similar in most respects (e.g., except for liquid viscosity) to those of the film assemblages shown for example in U.S. Pat. Nos. 3,415,644, 3,594,165, 3,443,500, and 3,473,925. In film units of this type, the two sheets between which the processing liquid is distributed are permanently secured in face-to-face relation and exposure is made through one of the sheets. A rupturable container of processing liquid is coupled with the sheets for dispensing its liquid contents between the sheets adjacent one edge of the area to be exposed and processed and the means retaining the sheets in face-to-face relation also function to prevent escape of the processing liquid from between the sheets at the sides thereof. The basic distinction, as will appear from the following description, is to be found in the nature of the processing liquid which heretofore has been required to have a high viscosity and in the construction of the components which serve to collect and retain any excess processing liquid overrun within the film unit.

The film unit, designated 10 in FIGS. 1 and 2, includes a rectangular sheet-like first or photosensitive element 12 located in superposition with a rectangular second or sheet-like image-receiving element 14, the latter having a length exceeding the length of element 12 by at least the shorter dimension of a rupturable container 16 containing processing liquid 18. Container 16 is mounted on the extended portion of image-receiving element 14 adjacent the leading edge of photosensitive element 12 in position to discharge its fluid contents between the photosensitive and image-receiving elements when subjected to compressive pressure. Photosensitive and image-receiving elements 12 and 14 are secured to one another at their lateral and trailing end margins by a binding element 20 formed with a rectangular exposure aperture 22 and having lateral edge portions 24 secured around and to the lateral margins of elements 12 and 14, and an end edge portion 26 secured around and to the trailing end margins of the photosensitive and second elements. Binding element 20 includes a leading end section 28 extending at least to the leading edge of image-receiving element 14 and secured to the forward surface of the image-receiving element. Container 16 may be secured to element 14 or, as in the embodiment shown, leading end section 28 of the binding element is folded around the leading edge of element 14 and secured to an edge portion 30 of container 16 to retain the container against the image-receiving element. A binding strip 32 is secured in overlapping relation to the leading edge of the photosensitive element and an edge of container 16 for conducting the processing liquid from the container between the photosensitive and image-receiving elements.

In a preferred embodiment of the film unit, the photosensitive element includes a layer containing a photosensitive, image-recording material and the image-receiving element includes an image-receptive layer adapted to function as a support for a transfer image formed by diffusion of image-forming substances from the photsensitive layer. Alternatively, the image-receptive layer may also comprise a component of first element 12 in which case, the second element 14 may merely function to aid in the distribution of the processing liquid between and in contact with the facing surfaces of the two elements. At least one of elements 12 and 14, preferably second element 14, is transparent to provide for exposure of the photosensitive material while the sheets are in superposition and viewing of the transfer image formed between the sheets. This construction enables the two sheets to be secured to one another at least at their margins and preferably throughout the entire area of the facing surfaces to form an integral unit, the integrity of which is established prior to loading into a camera and is maintained throughout and subsequent to exposure and processing.

Container 16 is of the type shown for example in U.S. Pat. No. 2,543,181, formed by folding a rectangular blank of a fluid impervious sheet material and sealing the marginal sections of the blank to one another to form a cavity for containing processing liquid 18. The seal between longitudinal sections 34 of the container is weaker than the end seals so upon the application of a predetermined compressive force to the walls of the container in the region of the liquid-filled cavity, there will be generated within the liquid hydraulic pressure sufficient to separate longitudinal marginal sections 34 throughout a portion thereof to form a discharge mouth for the processing liquid. Container 16 is attached to the sheets with the longitudinal edges of sections 34 located closely adjacent the leading edge of photosensitive element 12. The film unit may be supplied as part of a product including a container or cassette for holding a plurality of film units in stacked relation with the end or foremost film unit located in position for exposure. In such an embodiment, the first or photosensitive element should be opqaue or provided with an opaque coating or layer for preventing exposure of an underlying film unit.

Apparatus for advancing successive exposed film units, e.g., film units 10, from an exposure position within a film pack container or cassette and distributing a non-viscous free-flowing processing liquid within each film unit from one end of the exposed area to the other is illustrated in FIGS. 3 through 6 of the drawings. This apparatus is designed for incorporation in a manually operable and portable camera comprising the usual camera components such as a lens, shutter, housing and the like, for holding the film pack in a light-free environment and photoexposing successive film units to produce images therein. The apparatus illustrated in FIGS. 3 through 6 is designed to be employed with a film pack including a container or cassette, shown in broken lines in FIG. 4 and designated 40. Container 40 takes the form of a relatively thin, rectangular box having an exposure aperture in its forward wall, a slot at one end through which the film unit is movable, and slots in the forward wall at the oppotise end providing access to the trailing edge of the forwardmost film unit by means in the camera for advancing the leading end of a film unit from the container. A film pack structure of this general type is shown for example in U. S. Pat. Nos. 3,607,279, 3,607,283 and in the copending U. S. Pat. application of Irving Erlichman, Ser. No. 878,747 filed Nov. 21, 1969, now U.S. Pat. No. 3,682,062.

The processing apparatus of the invention comprises two pairs of juxtaposed pressure-applying members for engaging and applying compressive pressure to parallel spaced linear regions of the film unit. In the form shown, these include a first pair of rollers designated 42 and 44 mounted in juxtaposition with their axes substantially in the same plane, on a first support 46. Support 46 includes forward and rear members 48 and 50 joined at their ends by side members 52. Roller 42 includes shafts 54 on its ends mounted for rotation on side member 52 and roller 44 includes shafts 56 on its ends engaged for rotation in slots 58 in side members 52. This construction permits roller 44 to move toward and away from roller 42, the former being biased toward the latter by a torsion spring 60 mounted intermediate its ends on a bracket 62 on rear member 50. Spring 60 functions to bias roller 44 toward roller 42 into compressive engagement with a linear region of a film unit disposed between rollers 42 and 44.

Rollers 42 and 44 are designed to perform the dual functions of spreading the processing liquid between first and second elements 12 and 14 of a film unit while simultaneously advancing the film unit between the rollers. For this latter purpose, means are provided for rotating roller 42 and in the form shown include a gear 64 keyed to one of shafts 54. Suitable means including a motor or manual drive of a conventional type are also provided in the camera and although not shown, will include a gear adapted to mesh with gear 64 for driving roller 42.

The processing apparatus includes a second pair of pressure-applying members in the form of rollers 66 and 68 similar in construction and mounting to rollers 42 and 44 and adapted to apply compressive pressure to a linear region of a film unit for the purpose of restricting or inhibiting the spreading of the processing liquid between the superposed elements of the film unit and thereby cooperate with rollers 42 and 44 to maintain hydraulic pressure on the liquid. Rollers 66 and 68 are mounted in juxtaposition on a second support 70 comprising forward and rear members 72 and 74 connected at their ends by side members 76 formed with slots 78 for rotatably receiving shafts 80 on the ends of roller 68. Roller 66 is mounted for rotation on shafts 82 also journalled in side walls 76. A torsion spring 81 is mounted on a bracket 83 extending forwardly from rear member 74 and includes end portions engaged with shafts 80 biasing roller 68 forwardly toward roller 66. The spacing between the end walls and side walls of second support 70 are greater than the corresponding spacing between the end and side walls of first support 46 so that the end and side walls of the first support will telescope within the end and side walls of the second support permitting movement of the two supports and the rollers mounted thereon toward and away from one another as shown in the drawings.

The apparatus includes means for guiding first and second supports 46 and 70 for relative movement while biasing the pairs of rollers mounted thereon toward one another. The guide means include angles 84 engaging and slidably supporting second support 70. Forward members 48 and 72 and rear members 50 and 74 of the two supports are provided with overlapping tongues 86 disposed in sliding engagement for guiding the two supports during movement relative to one another. Resilient means in the form of coil springs 88 secured at their ends to posts 90 mounted on the forward and rear members of the two supports function to bias the supports and the pressure rollers mounted thereon toward one another so as to reduce the spacing between the linear regions at which the pressure rollers apply compressive pressure to the elements of a film unit engaged therebetween.

Figures 5, 6, 7, 8, 9:
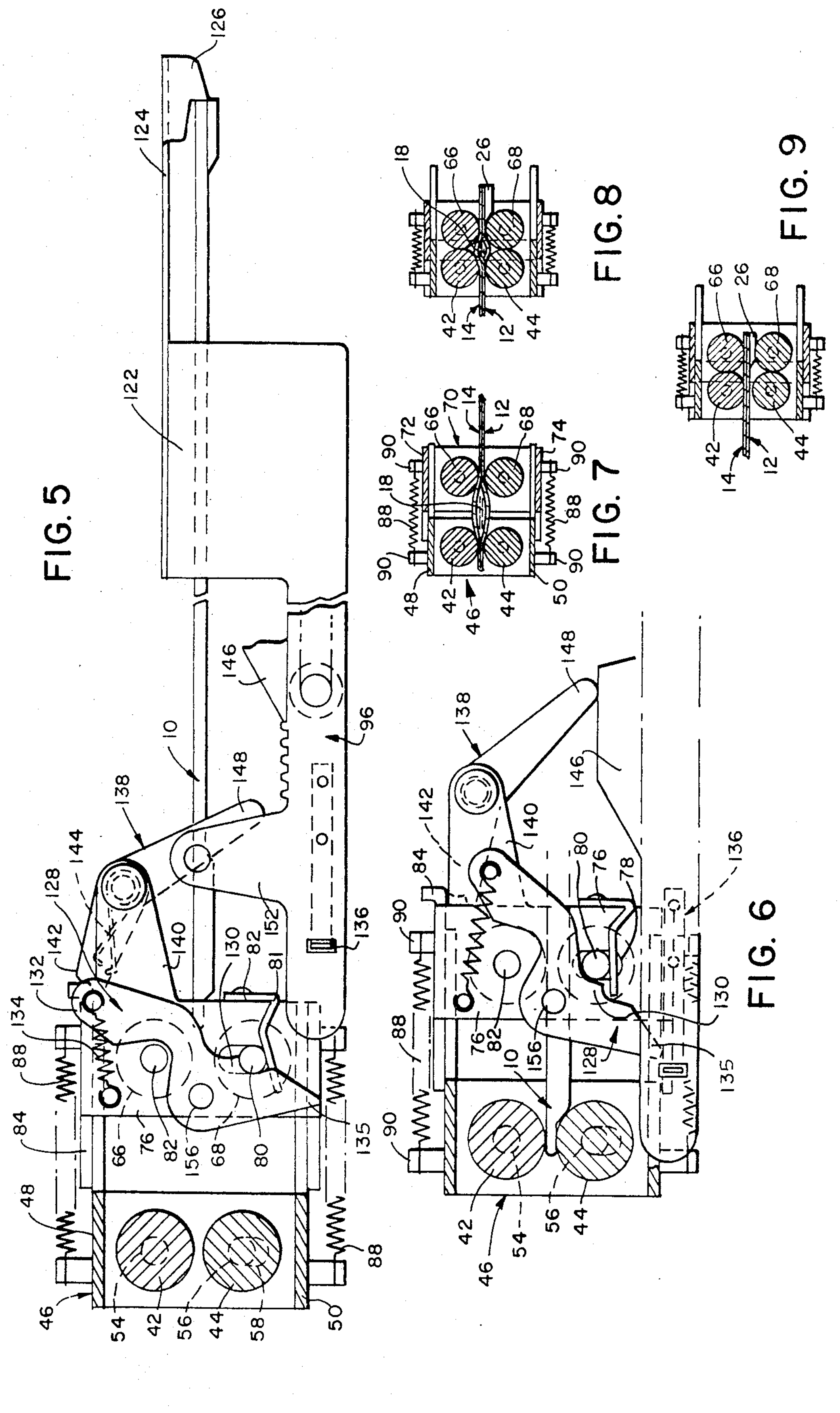
FIGS. 5 and 6 are elevational views similar to FIG. 4 showing details of the construction of the apparatus as well as the operation thereof.
FIGS. 7, 8 and 9 are schematic sectional views illustrating the method of the invention and the operation of the apparatus.

The process of the invention is illustrated schemactically in FIGS. 7 through 9. The first of these figures shows elements 12 and 14 engaged between the first and second pairs of pressure-applying rollers and a quantity of processing liquid 18 located between the portions of elements 12 and 14 intermediate the linear regions at which compressive pressure is applied by rollers 42 and 44, 66 and 68. The processing liquid may be introduced between the elements of the film unit in a number of different ways, for example, by employing a syringe. However, when a film unit 10 of the type shown in FIG. 1 is employed, rollers 66 and 68 are spaced apart and the portion of the film unit including container 16 is advanced between spaced rollers 66 and 68 into the bite of rollers 42 and 44 and then rollers 66 and 68 are released to move toward one another under the bias of torsion spring 81. During advancement of the leading end of a film unit including container 16 between rollers 66 and 68 into the bite of rollers 42 and 44, the two pairs of rollers are retained apart from one another against the bias of springs 88. Following release of roller 68 to move toward roller 66 and apply compressive pressure to the film unit, the supports on which the two pairs of rollers are mounted are released to move toward one another under the bias of springs 88 and reduce the spacing between the linear regions of the film unit at which compressive pressure is applied. The biases exerted between various springs are such that movement of the two pairs of rollers toward one another will be prevented by the relatively thick portion of the film unit located between the pairs of rollers enlarged by virture of the liquid contained under pressure between the elements of the film unit. For this purpose torsion springs 60 and 81 are designed to apply sufficient compressive pressure to linear regions of the film unit sufficient to prevent the liquid from escaping from between the portions of the film unit defined by the two linear regions. The liquid is also prevented from escaping at the ends of this region by virtue of the fact that the elements of the film unit are retained together at their lateral edges by edge portions 24 of binding element 20. Because the pairs of pressure rollers extend at least to and preferably beyond the lateral edges of the film unit, it may be desirable when employing a film unit of the type shown including external binding elements having a finite thickness, to provide steps in the roller peripheries so that the rolls conform to the variable cross-sectional thickness of the film unit and permit no liquid escape through and past the linear regions at which the rolls apply compressive pressure.

The apparatus of the invention may be employed with alternative forms of film units in which, for example, the sheet-like elements are securely bonded to one another near their lateral edges so that the binding elements, which add thickness to the film unit, may be omitted. Alternatively, the apparatus may be provided with means for applying compressive pressure to the lateral marginal portions of the elements of the film unit intermediate the linear regions at which compressive pressure is exerted by the rollers for the purpose of preventing escape of the processing liquid and maintaining hydraulic pressure thereon.

As the film unit is moved between the two pairs of pressure-applying rollers, the hydraulic pressure exerted by the liquid separates and maintains separation between the portions of the two elements intermediate the linear regions at which pressure is applied by the rollers. Thus, all portions of the facing surfaces of elements 12 and 14 are certain to be contacted by the processing liquid as the elements are moved relative to the pressure-applying rollers. During relative motion between the film unit and rollers, liquid will be absorbed by the layer containing the photosensitive material so that the quantity of liquid located between the portions of the sheets intermediate the linear regions at which pressure is applied, will gradually diminish as shown in FIG. 8. However, because the two pairs of pressure rollers are biased toward one another, the diminishing quantity of processing liquid will continue to be maintained under hydraulic pressure sufficient to hold the facing surfaces of the sheets apart from one another.

In order to insure complete wetting of the layer containing the photosensitive material throughout the exposed area thereof, excess processing liquid will be initially introduced between the elements of the film unit. Provision is made for collecting and retaining this excess processing liquid within a region thereof located adjacent and beyond the trailing end edge of the exposed area to be treated. In the form shown in FIGS. 1, 2 and 9, these means comprise components of the film unit itself and include a liquid retaining and trapping element 92 formed of an absorbant material such as a sponge, blotting paper, or other fibrous material, secured at the trailing edges of elements 12 and 14 within a space defined by end edge portion 26 of binding element 20. The film unit also includes wedge-shaped spacing members 94 located near the lateral margins of the film unit within the same space as trapping element 92 or, if desired, on the exterior of the film unit. Spacing members 94 are designed to pass between pressure rollers 66 and 68 relieving the pressure exerted thereby on the portion of the film unit intermediate the spacing members and containing trapping element 92 to permit the liquid to flow into and be absorbed by the trapping element. Spacing members 94 perform an additional function which will be described in greater detail hereinafter and which involves the spacing apart of rolls 66 and 68 to permit the leading end portion of a film unit including a container 16 to be advanced between rollers 66 and 68 without rupturing the container.

Figure 4:
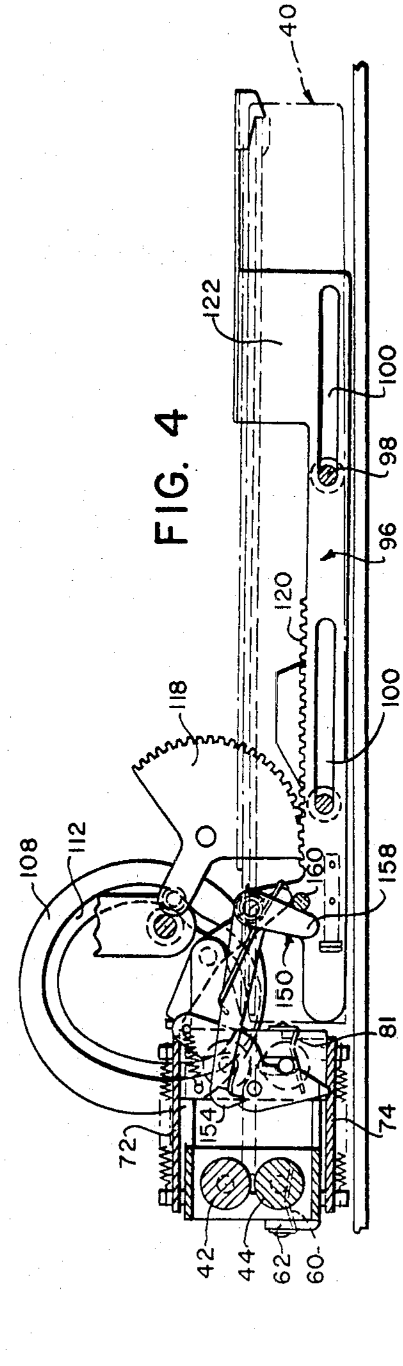
FIG. 4 is a sectional elevational view of the apparatus of FIG. 3.

The apparatus of the invention is constructed to advance an exposed film unit from a container subsequent to exposure of the film unit within the container and distribute a processing liquid between the elements or sheets of the film unit. The apparatus includes means for engaging the exposed film unit, advancing the leading end thereof between rollers 66 and 68 into the bite of rollers 42 and 44 and then releasing roller 68 to move under the bias of spring 81 toward roller 66 into compressive engagement with the film unit and also release the two sets of pressure rollers for movement toward one another under the bias of springs 88. FIGS. 4 and 5 illustrate this apparatus in the position immediately following exposure and prior to movement of the leading end of an exposed film unit between the second pair of rollers into the bite of the first pair of rollers.

The means for moving an exposed film unit from exposure position within film pack container 40 between a pair of pressure-applying rollers into the bite of another pair of rollers include a pair of drive members 96 mounted for reciprocating movement on studs 98 engaged in slots 100 in drive members 96. The camera includes a chasis designated 102 including side members 104 positioned to hold therebetween, a film pack container 40 illustrated in FIG. 3 as including a forward wall formed with an exposure aperture 106. Studs 98 are mounted on side members 104 and cooperate with slots 100 to permit drive members 96 to reciprocated linearly in the direction of movement of the film units from the container between the two pairs of pressure-applying rollers.

The apparatus includes means driven manually or by the same motor (not shown) employed to drive roller 42 via gear 64, for reciprocating drive members 96 to advance a film unit from the container between the rollers and actuate the various means for controlling the relative movement of the pressure-applying rollers. The means for reciprocating drive members 96 include a pair of cams 108 mounted on a common drive shaft 110 and each including a cam slot 112 for engaging a cam follower 114 mounted on an arm 116 extending from a sector gear 118 meshed with a rack 120 on a drive member 96. Cam slots 112 are designed, during one complete revolution of drive shaft 110, to rotate sector gears 118 in one direction to feed a film unit into the rollers, to provide a dwell period for processing and then rotate the sector gears in the opposite direction to return the drive members to their intial position. Thus the drive members 96 are reciprocated from the initial position shown in FIGS. 3, 4 and 5, to terminal positions shown in FIG. 6 and thence back to their initial positions. It is during movement of the drive members from their initial to their terminal positions that a film unit is advanced between and into the bite of the pressure-applying rollers and rollers 66 and 68 are released to compressively engage the film unit and move relative to rollers 42 and 44 under the bias of springs urging the two pairs of rollers toward one another. During the dwell period roller 42 is rotated to process the film unit and thereafter during the return motion of drive members 96, the two pairs of rollers are spaced apart from one another and returned to the initial relative positions shown in FIGS. 3 through 5 in readiness to process the next succeeding film unit.

Means are mounted on each of drive members 96 for engaging the trailing end of the forwardmost exposed film unit and advancing it between rollers 66 and 68 into the bite of rollers 42 and 44 during and in response to linear motion of drive members 96 from their initial position toward rollers 42 and 44. These last-mentioned means include an L-shaped bracket 122 which may be formed as an integral component of a drive member 96. Extending from the L-shaped bracket is an elongated spring arm 124 on the end of which is mounted a film engagement member 126 adapted to extend rearwardly through a slot in the forward wall of film container 40 into engagement with the trailing edge of the forwardmost (exposed) film unit to move the film unit toward the opposite end of the film pack container through an opening therein and between pressure rollers 66 and 68 into the bite of pressure rollers 42 and 44.

Means are provided on second support 70 for retaining pressure rollers 66 and 68 in spaced-apart relation and also preventing relative motion between the first and second supports 46 and 70 under the bias of springs 88. In the form shown most clearly in FIGS. 3 through 6, the means for releasably retaining pressure rollers 66 and 68 in spaced-apart relation comprise a pair of latching levers 128 each pivotally mounted on stud 156 on a side member 76 and including a step portion 130 for engaging a shaft 80 on roller 68 to retain the roller spaced apart from roller 66 against the bias of spring 81. Each of latching levers 128 includes an end section 132 coupled by a spring 134 to member 76 tending to bias the latching member in a counterclockwise direction and retain step 130 in engagement with shaft 80. The other end section designated 135 of each latching member extends into the path of movement of a detent spring 136 mounted on a drive member 96. Each detent spring 136 includes an extended cantilevered section attached to the drive member and an end section adapted to engage and pivot a latching lever 128 in a clockwise direction during motion of the drive member from its initial to its terminal position. During return motion, the detent spring 136 will be depressed so as to pass by end section 135 of latching lever 128. The position of the end section of spring 136 which engages and pivots the latching lever 128 to disengage step 130 from shaft 80 is such that roller 68 will be released to move under the bias of spring 81 toward roller 66 into compressive engagement with a film unit substantially simultaneously with movement of the leading end of the film unit 10 into the bite of rollers 42 and 44 which may be pregapped, as shown in FIG. 6, to facilitate entry of the leading edge of the film unit into the bite of the rollers.

The means for retaining the two pairs of pressure-applying rollers apart from one another are also mounted on second support 70 and prevent motion of the second support relative to first support 46 which, in the embodiment shown, is mounted in fixed position within the camera. These last-mentioned means include a pair of latch members 138 each pivotally mounted intermediate its ends on an extension 140 of a side member 76. Each latch member 138 includes an end section 142 biased in a clockwise direction by a torsion spring 144 upwardly into position to engage the end of a guide angle 84 and retain the second support against motion relative to the fixed guide angle and first support 46. The latch member 138 is released from engagement during the terminal portion of movement of drive members 96 immediately following release of latching levers 128 from shafts 80. Release of each latch member 138 is accomplished by a cam 146 on each drive member 96 adapted to engage an end section 148 of latch member 138 to pivot the latter against the bias of torsion spring 144 so as to disengage end section 142 from guide angle 84. Latch members 138 are disengaged from guide angles 84 immediately following disengagement of latching levers 128 from shafts 80 to allow the two pairs of rolls and film unit 10 to assume the relative positions shown in FIG. 6 in which rolls 42 and 44 are engaged with the leading edge of the film unit adjacent one side of the liquid-filled cavity of container and rolls 66 and 68 engage the film unit immediately adjacent the other side of the liquid-filled cavity of the container. Rollers 66 and 68 are prevented from moving toward rolls 42 and 44 by virture of the additional thickness of the container, the walls of which are held apart by the processing liquid under pressure.

In the embodiment shown and described, roll 42 and cam drive shaft 110 are rotated continuously throughout a processing cycle and a reset cycle in which the drive members 96 and second support 70 are returned to the initial positions shown in FIG. 5.

During the terminal portion of movement of film unit 10 between the pressure rollers of the two pairs, rollers 66 and 68 are spaced apart by spacing members 94 of the film unit as the trailing end of the film unit passes between rollers 66 and 68. When this occurs, latching levers 128 pivot counterclockwise into engagement with shafts 80 to retain rollers 66 and 68 in the spaced-apart position shown in FIG. 5 necessary to enable a leading end of a film unit, including container 16, to pass between the rollers. The other part of the return cycle involves spacing the two sets of pressure-applying rollers apart from one another, that is, returning second support 70 and rollers 66 and 68 mounted thereon to their initial position. For this purpose, an engagement crank 150 is mounted intermediate its ends on an upstanding bracket 152 on each of drive members 96. Engagement crank 150 includes an arm 154 having a hook-shaped section biased into engagement with a stud 156 mounted on side member 76 and providing a pivot for latching lever 128. During the return motion of drive members 96, the hook-shaped end sections of arms 154 of engagement cranks 150 engage studs 156 moving second support 70 relative to first support 46 against the bias of springs 88 to the initial position shown in FIG. 5. During this return movement of support 70, end sections 142 of latch members 138 move past the ends of guide angle 84 and pivot under the bias of springs 144 into engagement with the guide angles to prevent return motion of the second support member under the bias of springs 88. Immediately after latch members 138 have pivoted in a clockwise position into position to engage guide angles 84 and prevent motion of second support member 70, a second arm 158 of each of engagement cranks 150 engages a fixed member or stud 160 mounted on the camera chassis for pivoting arms 154 of engagement cranks 150 out of engagement with studs 156 on side members 76. The travel of drive members 96 is such that engagement cranks 150 cause second support 70 to overtravel past the initial position shown in FIG. 5 so that when arms 154 of the engagement cranks are disengaged from studs 156, the second support will move in the opposite direction under the bias of springs 88 until further motion is prevented by latch members 138. At this position, the hook-shaped end sections of arms 154 of the engagement cranks will be located out of engagement with studs 156 so that the second support is free to move under the bias of spring 88 when latch members 138 are pivoted from engagement with guide angles 84.

Figure 10:
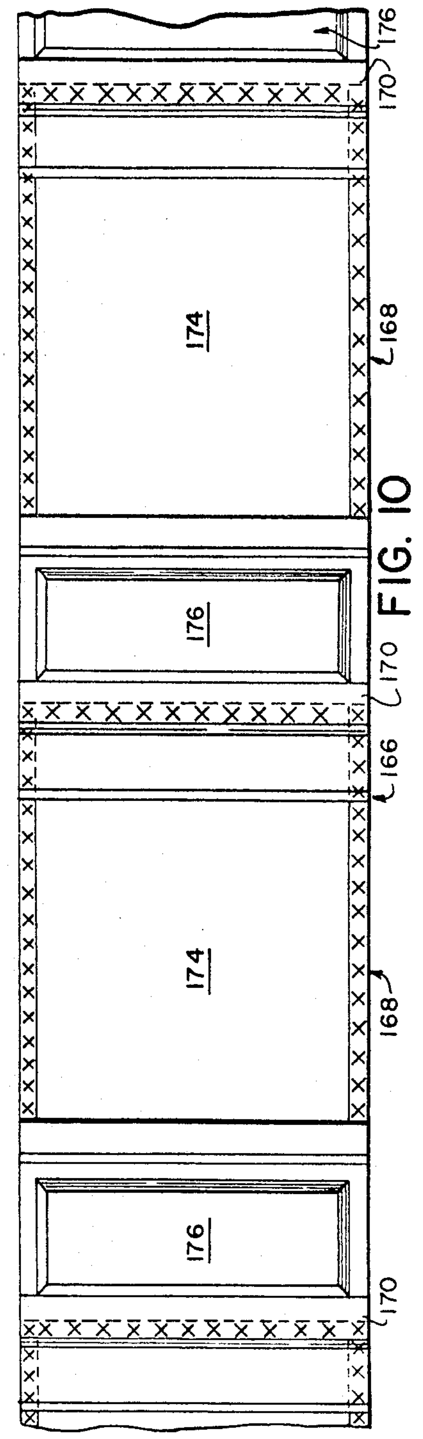
FIG. 10 is a plan view of another embodiment of a photographic film assemblage useful in the method and apparatus of the invention.
Figure 11:
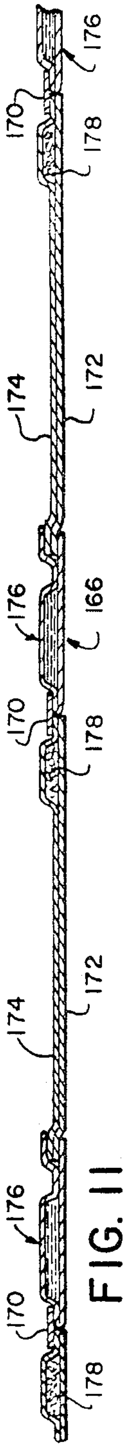
FIG. 11 is a sectional view taken substantially midway between the sides of the film assemglage of FIG. 10.

Another embodiment of a film assemblage useful in practicing the method of the invention is illustrated in FIGS. 10 and 11 of the drawings. This film assemblage, designated 166, comprises a plurality of areas of photosensitive sheet material adapted to be exposed and processed in sequence and is constructed so that it can be coiled and successive areas uncoiled, exposed and processed. In the form shown, film assemblage 166 comprises a succession of film units each designated 168 and including all the materials required to produce a visible photographic image by a diffusion transfer process, joined to one another by connecting strips 170. Each film unit 168 comprises a first or photosensitive sheet 172 including a layer of photosensitive image-recording material of the type described hereinbefore, and a second or image-receiving sheet 174 secured in face-to-face relation with the photosensitive sheet at least in the margins thereof. Second sheet 174 is transparent, may include a layer of image-receptive material, or merely aid in the distribution of a processing liquid between the two sheets. The second sheet is securely adhered to the photosensitive sheet 172 in the X-hatched areas so as to prevent escape of processing liquid from between the two sheets at the lateral margins and trailing edges thereof. A rupturable container 176 of processing liquid of the type previously described is attached to the leading edges of each pair of first and second sheets 172 and 174 and a liquid trapping element 178 formed of an absorbant material is secured between sheets 172 and 174 adjacent the trailing ends thereof for collecting and retaining excess processing liquid overrun. Each connecting strip 170 is joined to the trailing edge portion of a second sheet 174 and the leading edge portion of the container 176 of the next succeeding film unit. The connecting strips may be joined to adjacent film units by a strippable adhesive and/or may be weakened or precut to facilitate separation of the film units from one another.

Film assemblage 166 comprises a sequence of areas adapted to be exposed and processed, preferably in an apparatus to be described hereinafter in which the film assemblage remains stationary during both exposure and processing. Other embodiments of film assemblages of this basic type adapted to be either folded or coiled, are possible. For example, connecting strips 170 may be provided of sufficient length to permit the individual film units to be stacked on top of one another in a container or film cassette similar to that previously described. Alternatively, either the photosensitive or image-receiving sheet may be continuous rather than discontinuous so that the connecting strips may be omitted and the rupturable containers 176 would be mounted on the continuous sheet and each would be attached near the leading edge of a dicontinuous sheet. The particular image-forming process may be of the type which permits or requires the first and second sheets to be retained in contact with one another prior, during and subsequent to exposure and processing; or either or both sheets may be of the type in which the photosensitive and image-receiving sheets are separated from one another subsequent to processing. In embodiments in which one of the sheets is continuous and/or the image-containing area of one of the sheets is separated from another sheet, the continuous sheet i.e., the image-receiving sheet, may be precut to facilitate separation of the desired portion of the sheet from the reaminder thereof.

Reference is now made to FIGS. 12 through 15 wherein there is illustrated photographic apparatus adapted for incorporation in a manually portable camera and designed for processing a film assemblage of the type illustrated in FIGS. 10 and 11. As previously noted, this processing apparatus is designed to distribute a processing liquid between the first and second sheets in contact with an exposed area of a layer of photosensitive material while the film assemblage is held stationary. The apparatus comprises a generally planar backing member 180 adapted to function as a pressure-applying member of two pairs of pressure-applying members. The other pressure-applying members of the two pairs comprise a first roller 182 and a second roller 184 mounted respectively on a first support 186 and a second support 188. Supports 186 and 188 are generally U-shaped and are similar to those previously described. First support 186 includes a pair of end members 190 joined by a connecting member 192 and second support 188 includes a pair of end members 194 joined by a connecting member 196. The first and second supports are formed and dimensioned to permit first support 186 to telescope within second support 188. The two supports are biased toward one another by springs 198 shown as connected at their ends to studs 200 mounted on connecting members 192 and 196.

Roller 182 is mounted for rotation on shafts 202 extending from the ends thereof and engaged for rotation in slots 204 in end members 190. A torsion spring 206 mounted on a bracket 208 extending from connecting member 192 and engaged at its ends with shafts 202, functions to bias roller 182 forwardly toward backing member 180 to apply compressive pressure to a film assemblage engaged between the roller and backing member. Roller 184 is similarly mounted on shafts 210 rotatably engaged in slots 212 in end members 194 and is biased toward backing member 180 by a torsion spring 214 mounted on a bracket 216 extending from connecting member 196. First and second supports 186 and 188 are mounted for reciprocating movement parallel with the plane of the surface of backing member 180 from an initial position in which rollers 182 and 184 are disposed, respectively, in front and behind a container 176 of processing liquid supported on the surface of support member 180, to a terminal position at the opposite or trailing end of the film unit. For this purpose the camera is provided with a pair of L-shaped guide members 218 for engaging second support 188 at the corners thereof where end members 194 and connecting member 196 are joined. The camera also includes a pair of combination guide and cam members 220, each including a generally L-shaped section 222 for slidably engaging the surfaces of end members 194 and the edges of both end members 190 and 194. It will be seen from the drawings that second support 188 is engaged at opposite ends for sliding movement between guide members 218 and L-shaped sections 222 of members 220.

Figures 12, 13, 14, 15:
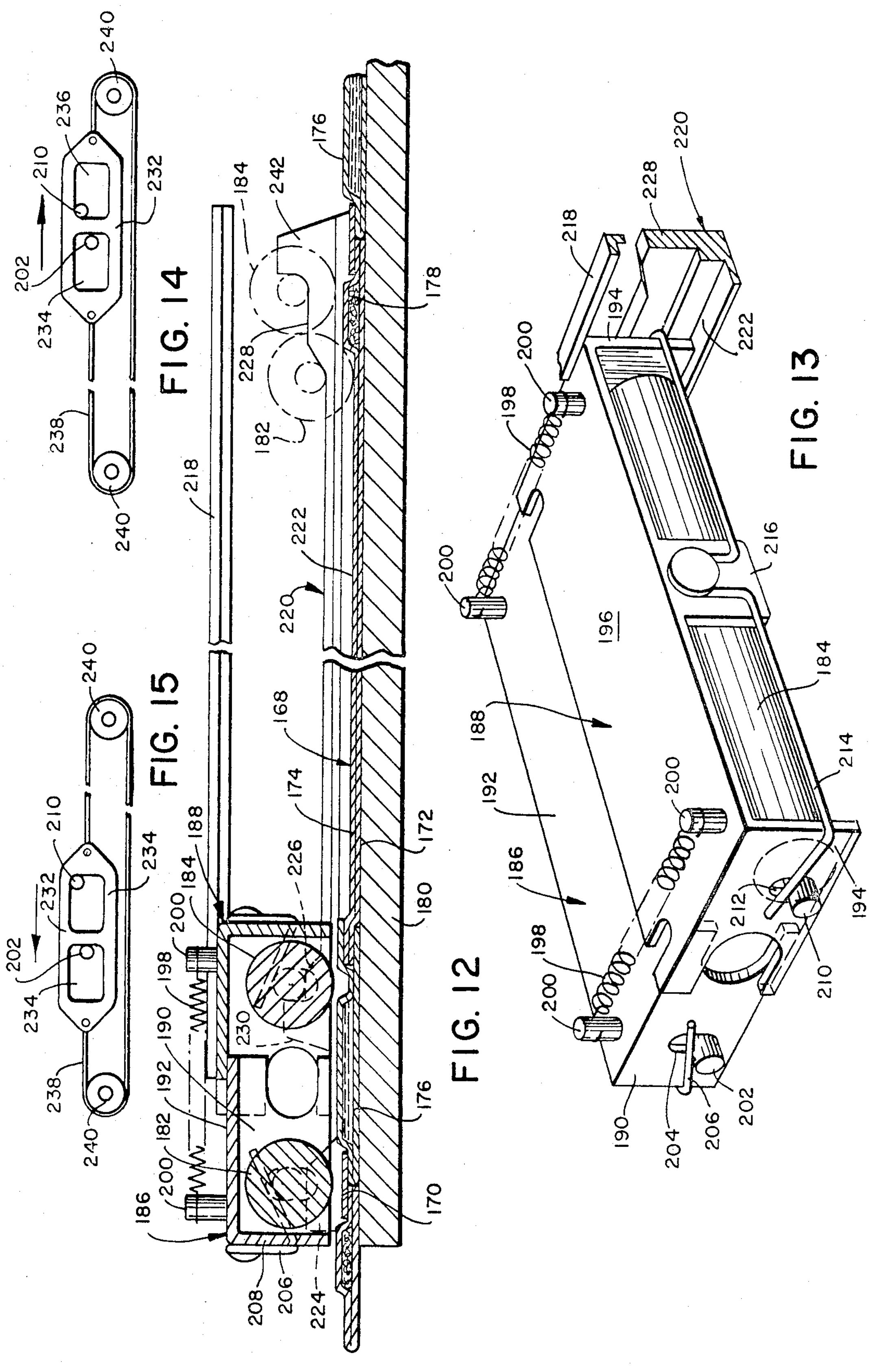
FIG. 12 is an elevational sectional view of another embodiment of the apparatus of the invention adapted to use with the film assemblage of FIG. 10.
FIG. 13 is a perspective view of components of the apparatus of FIG. 12.
FIGS. 14 and 15 are somewhat schematic, elevational views of components of the apparatus of FIG. 12, illustrating the operation thereof and the method of the invention.

In the operation of the apparatus shown in FIGS. 12 and 13, an area of photosensitive sheet 172 is exposed to light in the usual manner. The film unit 168 of which the photosensitive element is a part may be either positioned for exposure on backing member 180 or it may be exposed at another location within the camera and moved into position to be processed against the backing member as shown in FIG. 12. Following exposure and with the film unit positioned as shown, supports 186 and 188 are moved from their initial position toward the trailing end of the film unit, i.e., to the right viewing FIG. 12. In their initial position both rollers 182 and 184 are spaced apart from backing member 180 to permit a container 176 and/or the section of the film unit including trapping element 178 to pass between a roll or rollers and the backing member without being compressed. For this purpose the apparatus is provided with three pairs of cams designated 224, 226 and 228 which are formed as an integral portion of guide and cam members 220. In the initial position shown in FIG. 12, cams 224 and 226 engage, respectively, shafts 202 and 210, for biasing the shafts against springs 206 and 214 to space rollers 182 and 184 away from backing member 180. This permits a film unit to move into and from the position shown in which the film unit is processed without compression of the container or liquid trapping element of the film unit.

Cams 224 and 226 are shaped such that immediately upon commencement of movement of supports 186 and 188, shafts 202 and 210 drop off the cams into compressive engagement with a film unit. Guide and cam members 220 also include means for retaining the frame members and rollers mounted thereon apart from one another in the initial position shown. These means include stop members 230 for engaging shafts 210 and preventing further motion of the shafts (to the left, viewing FIG. 12) from the initial position thereof. Thus it will be seen that as the frame members and rollers commence to move to the right from their initial position, the rollers are released to move toward one another under the bias of springs 198 as well as toward backing members 180 into compressive engagement with a film unit.

The apparatus includes means for reciprocating the supports and rollers between their intial and terminal positions. These means are shown in FIGS. 14 and 15 as comprising two pairs of drive members 232 adapted to engage shaft 202 and 210 in respective openings 234 and 236 in the drive members. The openings are enlarged to permit movement of the drive members relative to shafts 202 and 210 both in the direction of reciprocating motion of the drive members and normally thereto. Each of drive members 232 is connected at its ends to a flexible driven element 238 such as a chain, belt, or the like, engaged around a pair of spaced rotary members 240, at least one of which is driven to reciprocate drive members 132. During liquid distribution movement (to the right) of pressure rollers 182 and 184, shafts 210 are engaged in opening 236 for driving roller 184 and second support 188 to the right causing roller 182 to follow by virture of the spring connection between supports 186 and 188. Roller 182 tends to catch up to roller 184 as the quantity of processing liquid within the region between the sheets bounded by the linear regions at which the rollers 182 and 184 compressively engage the sheets, is reduced until the rollers reach the terminal position shown broken lines in FIG. 12. In this position the rollers have reached their closest proximity and roller 184 has passed over the region of the film unit including trapping element 178. During the terminal portion of the movement of the rollers, cams 228 engage shafts 210, spacing roller 184 apart from backing member 180 to relieve the pressure exerted on the film unit and provide for collection and retention of excess processing liquid overrun within the trapping element. A stop 242 may be provided for engaging and arresting the motion of shafts 210 although such an arrangement may be unnecessary provided that motion of driven elements 238 is arrested at the proper time.

Following completion of the distribution of the processing liquid, the direction of movement of drive members 232 is reversed and shafts 202 are engaged in openings 234 for returning the rollers and their supports to the left to the initial position shown in FIG. 15. During return movement of the rollers and supports, shafts 202 and 210 are engaged and displaced forwardly from backing member 180 by cams 224 and 226 and return movement of roller 184 is arrested prior to return movement of roller 182 by engagement of shafts 210 with stop members 230. In this way the pressure rollers are spaced apart from one another and from backing member 180 to permit the processed film unit to be moved between the rollers and backing member and the container 176 of a subsequent film unit to be moved into position between rollers 182 and 184.

It should be understood that the processing apparatus shown and described is intended to be illustrative and not limiting and that other embodiments and constructions are possible and are considered to fall within the scope of the invention. For example, neither pressure-applying member of each pair need comprise a roller but may include a rigid member for contacting the film substantially along a line and is biased toward the other member, with neither member rotating or otherwise moving to advance the film. For use with such a structure, the film assemblage may include a leader for drawing the film between the two pairs of pressure-applying members. Alternatively, the pressure-applying means, i.e., rollers may be formed with elastomeric or compliant surfaces rather than hard, rigid surfaces so as to conform to the film. Similarly, it should be understood that a variety of film assemblage constructions other than those shown for purposes of illustration, including viscous processing liquids, can be employed in the method and apparatus of the invention.

The apparatus and method of this invention may be readily distinguished from that shown in U. S. Pat. No. 3,264,969 issued Aug. 9, 1966 to Edwin H. Land; in that patent, two pairs of pressure applying members are shown but they remain in fixed relationship to each other as the processing fluid is applied.

The objects of the invention have been achieved in a novel and improved method and apparatus for distributing a non-viscous, free-flowing liquid over a rectangular exposed area between a pair of superposed photographic sheets beginning at one edge of the area and progressing toward the other edge. This is accomplished by moving the film assemblage between a first pair of juxtaposed pressure-applying members for advancing a mass of liquid between the sheets while simultaneously laminating the wet sheets. The film assemblage is simultaneously compressed between a second pair of pressure-applying members which engage the assemblage ahead of the advancing mass of liquid to maintain the liquid under pressure and as the liquid is absorbed and the quantity of the mass of liquid is decreased, the two pairs of pressure-applying members are moved closer together to maintain the hydraulic pressure. It is by virtue of this novel concept that progressive spreading and absorption of a non-viscous liquid is achieved rapidly and with assurance with apparatus that is relatively simple in its construction and dependable in its operation.

Since certain changes may be made in the above method and apparatus without departing from the scope of the invention herein involved, it is intended that all matter contained in the above description or shown in the accompanying drawings shall be interpreted as illustrative and not in a limiting sense.

I claim:

1. The method of treating an exposed area of a photosensitive layer to form a photographic image comprising the steps of:

supporting said layer between a pair of superposed sheets on one of said sheets;

locating pairs of juxtaposed members in compressive engagement with spaced apart linear portions of said sheets extending at least from side to side of said area, said linear portions defining the sides of a region between said sheets including an extremity of said exposed area;

introducing a liquid processing agent into said region between said sheets capable of processing said photosensitive layer to form an image;

retaining said sheets together at the ends of said region to prevent escape of said liquid therefrom;

moving said pairs of juxtaposed members relative to and in engagement with said sheets toward the opposite extremity of said area to contact all portions of said area with said liquid contained in said region between said sheets; and while moving said pairs of juxtaposed members relative to said photsensitive layer, moving one of said pairs of members toward the other to generate and maintain hydraulic pressure within said liquid within said region sufficient to hold the facing surface of said sheets apart from one another throughout the extent of said region.

2. The method of claim 1 further including the step of biasing at least one of said pairs of members toward the other pair of members.

3. The method of claim 2 further including the step of biasing said one pair of members toward said other pair of members with a substantially constant force.

4. The method of claim 2 further including the step of biasing the members of at least one pair toward one another.

5. The method of claim 1 further including the step of locating said members in compressive engagement with spaced-apart linear portions of a container having a liquid-filled cavity coupled with one of said sheets and causing relative motion between said members and said container and said sheets to eject said liquid from said container between said sheets.

6. The method of claim 5 further including the steps of spacing said members of said one pair apart, moving said container relative to and between said spaced-apart members to locate the liquid-filled cavity of said container between said pairs of juxtaposed members and moving said members of said one pair into compressive engagement with said container prior to relative motion of said container and said members.

7. The method of claim 6 further including the steps of rotating at least one of said members of said other pair of members in engagement with said container to cause relative motion between said members and said container and said sheets.

8. The method of claim 1 further including the steps of rotating at least one of said members of said pair spaced from the other of said pairs in the direction of motion of said sheets relative to said members to cause relative movement between said members and said sheets.

9. The method of claim 1 wherein relative motion of said members and said sheets is continued at least until both of said pairs of said members have passed beyond said opposite extremity of said exposed area.

10. The method of claim 9 wherein said sheets are maintained in face-to-face contact for a predetermined period following relative motion of said pairs of members past said opposite extremity of said exposed area and at the end of said period, at least the portions of said sheets including said area are separated from one another.

11. The method of claim 9 further including the steps of spacing said members of one of said pair of members apart as they pass beyond said opposite extremity of said exposed area to collect liquid overrun between said sheets ahead of said members of the other pair.

12. The method of claim 11 further including rotating at least one of said members of said other pair to cause relative motion between said members and said sheets.

13. The method of claim 1 wherein said liquid processing agent is introduced between said sheets with a viscosity substantially the same as water.

14. The method of treating an exposed area of a photsensitive layer to form a photographic image comprising the steps of:

supporting said layer between a pair of superposed sheets on one of said sheets;

locating a pair of members in compressive engagement with spaced apart linear portions of said sheets extending at least from side to side of said area, said linear portions defining the sides of a region between said sheets including an extremity of said exposed area;

introducing a liquid processing agent into said region between said sheets capable of processing said photosensitive layer to form an image;

retaining said sheets together at the ends of said region to prevent escape of said liquid therefrom;

moving said pair of members relative to and in engagement with said sheets toward the opposite extremity of said area to contact all portions of said area with said liquid contained in said region between said sheets; and while moving said pair of members relative to said photosensitive layer, moving at least one member of said pair of members toward the other member of said pair to generate and maintain hydraulic pressure within said liquid within said region sufficient to hold the facing surfaces of said sheets apart from one another throughout the extent of said region.

15. Photographic apparatus for treating a photosensitive film unit by distributing a liquid processing agent to process a photosensitive layer located between a pair of superposed sheets to form an image between said sheets, said apparatus comprising, in combination:

a first pair of pressure members for applying compressive pressure to a first linear region of a photographic film unit engaged between said members;

a second pair of juxtaposed pressure members for applying compressive pressure to a second linear region of a film unit engaged between said members of said second pair;

means for causing relative movement between a film unit and said pressure members of said first and second pairs; and mounted means for supporting said first and second pairs of pressure members in position to simultaneously apply compressive pressure to the first and second linear regions of a film unit, the first and second linear regions being spaced from each other, said mounting means supporting at least one pressure member of one of said pairs for movement relative to one pressure member of said other pair to vary the spacing between said linear regions to maintain hydraulic pressure within a liquid processing agent located between said linear regions sufficient to hold the facing surfaces of the sheets apart from one another throughout the extent of the spacings between said linear regions.

16. Photographic apparatus as defined in claim 15 wherein said mounting means support said first and second pairs of pressure members in position to apply compressive pressure to substantially parallel spaced linear regions of a film unit.

17. Photographic apparatus as defined in claim 16 wherein at least one of said one pressure members is a roller and further including means for rotating said roller in engagement with a film unit to move the latter relative to said pressure members.

18. Photographic apparatus for treating a photosensitive film unit by distributing a liquid processing agent to process a photosensitive layer located between a pair of superposed sheets to form an image between said sheets, said apparatus comprising, in combination:

a first pair of pressure members for applying compressive pressure to a first linear region of a photographic film unit engaged between said members;

a second pair of juxtaposed pressure members for applying compressive pressure to a second linear region of a film unit engaged between said members of said second pair;

mounting means for supporting said first and second pairs of pressure members in position to simultaneously apply compressive pressure to the first and second linear regions of a film unit, the first and second linear regions being spaced from each other, said mounting means supporting at least one pressure member of one of said pairs for movement relative to one pressure member of said other pair to vary the spacing between said linear regions;

means for causing movement of a film unit relative to and between said pressure members of said first and second pairs; and resilient means for biasing at least said one pressure member of said one pair toward said one pressure member of said other pair to reduce the spacing between said linear regions.

19. Photographic apparatus as defined in claim 18 wherein said mounting means support said pressure members of at least said first pair for relative motion toward and away from one another.

20. Photographic apparatus as defined in claim 19 further including second resilient means for biasing said pressure members of said first pair toward one another into compressive engagement with the first linear region of a film unit engaged therebetween.

21. Photographic apparatus as defined in claim 20 further including means for releasably retaining said pressure members of said first pair in spaced apart relation.

22. Photographic apparatus as defined in claim 20 further including means for spacing apart said pressure members of said first pair and releasably retaining said pressure members in spaced apart relation.

23. Photographic apparatus as defined in claim 22 wherein said one pressure member of said first pair is a roller and further including means for rotating said roller in engagement with a film unit to advance said film unit relative to and between said pressure members of said first and second pairs.

24. Photographic apparatus as defined in claim 18 further including means for moving said one pressure members apart from one another against the bias of said resilient means.

25. Photographic apparatus as defined in claim 24 further including means for releasably retaining said one pressure member of each pair apart from one another.

26. Photographic apparatus as defined in claim 25 further including second resilient means for biasing said pressure members of said first pair toward one another into compressive engagement with the first region of a film unit engaged therebetween.

27. Photographic apparatus as defined in claim 26 further including means releasably retaining said pressure members of said first pair in spaced apart relation.

28. Photographic apparatus as defined in claim 27 further including means for releasing said pressure members of said first pair for movement toward one another under the bias of said second resilient means and thereafter releasing said one pressure members for relative motion toward one another under the bias of said first mentioned resilient means.

29. Photographic apparatus for treating a photographic film unit to form an image within said film unit by distributing a liquid processing agent to process a photosensitive layer located between a pair of superposed sheets, said apparatus comprising, in combination:

first pressure means for engaging and applying compressive pressure to a first linear region of a photographic film unit;

second pressure means for engaging and applying compressive pressure to a second linear region of said photographic film unit;

mounting means for supporting said first and second pressure means in position to simultaneously apply compressive pressure to the first and second linear regions of a film unit, the first and second linear regions being spaced from each other, said mounting means supporting said first pressure means for movement relative to said second pressure means to vary the spacing between said linear regions to maintain hydraulic pressure within a liquid processing agent located between said linear regions sufficient to hold the facing surfaces of the sheets apart from one another throughout the extent of the spacing between said linear regions; and means for causing motion of a film unit relative to and in engagement with said first and second pressure means.

30. Photographic apparatus as defined in claim 29 wherein said mounting means support said first and second pressure means in position to apply compressive pressure to substantially parallel linear regions of a film unit.

31. Photographic apparatus as defined in claim 30 wherein at least one of said pressure means includes a roller and said apparatus further includes means for rotating said roller in engagement with a film unit to move the latter relative to said pressure means.

32. Photographic apparatus as defined in claim 29 wherein said second pressure means include a pair of juxtaposed pressure members movable toward and apart from one another and resilient means for biasing said pressure members toward one another to apply compressive pressure to the second linear region of a film unit engaged therebetween, and said apparatus further includes retaining means for releasably holding said pressure members in spaced apart relation.

33. Photographic apparatus as defined in claim 32 further including means for spacing said pressure members apart from one another.

34. Photographic apparatus for treating a photographic film unit to form an image within said film unit by distributing a liquid processing agent to process a photosensitive layer located between a pair of superposed sheets, said apparatus comprising, in combination:

first pressure means for engaging and applying compressive pressure to a first linear region of a photographic film unit;

second pressure means for engaging and applying compressive pressure to a second linear region of said photographic film unit;

mounting means for supporting said first and second pressure means in position to simultaneously apply compressive pressure to the first and second linear regions of a film unit, the first and second linear regions being spaced from each other, said mounting means supporting said first pressure means for movement relative to said second pressure means to vary the spacing between said linear regions;

means for causing motion of a film unit relative to and in engagement with said first and second pressure means; and resilient means for biasing said first and second pressure means toward one another to reduce the spacing between said linear regions.

35. Photographic apparatus as defined in claim 34 further including means for effecting relative motion of said first and second pressure means apart from one another.

36. Photographic apparatus as defined in claim 35 further including means for releasably retaining said first and second pressure means apart from one another.

37. Photographic apparatus for treating a photographic film unit to form an image within said film unit by distributing a liquid processing agent to process a photosensitive layer located between a pair of superposed sheets, said apparatus comprising, in combination:

first pressure means for engaging and applying compressive pressure to a first linear region of a photographic film unit;

second pressure means including a pair of juxtaposed pressure members movable toward and apart from one another for engaging and applying compressive pressure to a second linear region of said photographic film unit;

first resilient means for biasing said pressure members toward one another;

retaining means for holding said pressure members in spaced apart relation;

mounting means for supporting said first and second pressure means in position to simultaneously apply compressive pressure to the first and second linear regions of a film unit, the first and second linear regions being spaced from each other, said mounting means supporting said first pressure means for movement relative to said second pressure means to vary the spacing between said linear regions;

second resilient means for biasing said first and second pressure means toward one another to reduce the spacing between said linear regions; and means for causing motion of a film unit relative to and in engagement with said first and second pressure means.

38. Photographic apparatus as defined in claim 37 further including retaining means for releasably holding said first and second pressure means in spaced apart relation.

39. Photographic apparatus as defined in claim 38 further including advancement means for effecting relative motion between said first and second pressure means and a film unit to advance the leading end portion of the film unit relative to and between said pressure members into engagement with said first pressure means.

40. Photographic apparatus as defined in claim 39 wherein said advancement means include means for releasing said pressure members for movement toward one another into compressive engagement with a film unit and thereafter releasing said first and second pressure means for movement toward one another.

41. Photographic apparatus as defined in claim 40 wherein said advancement means further include means for spacing said first and second pressure means apart from one another.

42. Photographic apparatus as defined in claim 41 wherein said first pressure means include a roller for engaging the first linear region of a film unit and said apparatus includes means for rotating said roller in engagement with a film unit to move the film unit relative to and in engagement with said first and second pressure means.

* * * * *